United States Patent
Snyder et al.

[11] Patent Number: 5,449,286
[45] Date of Patent: Sep. 12, 1995

[54] CONTROLLED FLAME FUEL JET COMBUSTION

[75] Inventors: William J. Snyder, Ossining; Hisashi Kobayashi, Putnam Valley, both of N.Y.

[73] Assignee: Praxair Technology, Inc., Danbury, Conn.

[21] Appl. No.: 79,588

[22] Filed: Jun. 22, 1993

[51] Int. Cl.[6] .............................. F23C 5/00
[52] U.S. Cl. .............................. 431/9; 431/8; 431/182; 431/183; 431/187
[58] Field of Search .............. 431/8, 9, 10, 182, 183, 431/184, 187, 353

[56] References Cited

U.S. PATENT DOCUMENTS

| | | | |
|---|---|---|---|
| 2,138,998 | 12/1938 | Brosius | 158/7 |
| 3,481,680 | 12/1969 | Kohn | 431/182 |
| 3,658,289 | 4/1972 | Hodges | 431/182 X |
| 3,676,060 | 7/1972 | Bedetti | 23/277 R |
| 3,836,315 | 9/1974 | Shulax | 431/9 |
| 3,905,751 | 9/1975 | Hemsath et al. | 431/183 |
| 4,303,386 | 12/1981 | Voorheiss et al. | 431/183 X |
| 4,427,367 | 1/1984 | Yagisawa | 431/182 X |
| 4,515,553 | 5/1985 | Morimoto et al. | 431/8 |
| 4,690,635 | 9/1987 | Coppin | 431/187 |
| 4,797,087 | 1/1989 | Gitman | 431/10 |
| 4,883,422 | 11/1989 | Cristea | 431/182 |
| 4,986,748 | 1/1991 | Brown et al. | 431/188 |
| 5,100,313 | 3/1972 | Anderson et al. | 431/8 |
| 5,169,304 | 12/1992 | Hament et al. | 431/183 |
| 5,199,866 | 4/1993 | Joshi et al. | 431/353 |
| 5,209,656 | 5/1993 | Kobayashi et al. | 431/187 |
| 5,256,058 | 10/1993 | Slavejkoo et al. | 431/8 X |
| 5,295,816 | 3/1994 | Kobayashi et al. | 431/9 |

FOREIGN PATENT DOCUMENTS

| | | | |
|---|---|---|---|
| 568163 | 1/1933 | Germany | 431/182 |
| 238068 | 5/1965 | U.S.S.R. | 431/182 |
| 0777355 | 11/1980 | U.S.S.R. | 431/182 |
| 0989245 | 1/1983 | U.S.S.R. | 431/9 |

Primary Examiner—Carl D. Price
Attorney, Agent, or Firm—Stanley Ktorides

[57] ABSTRACT

A combustion method wherein high velocity fuel is injected into a cavity recessed from a furnace zone for flow into the furnace zone, low velocity oxidant fluid is injected into the cavity for coaxial flow with the fuel, and the resulting combusting fuel and oxygen has imparted to it an angular component by operation of swirling oxygen flow and/or outwardly angled fuel flow, enabling control of the high velocity flame length.

9 Claims, 2 Drawing Sheets

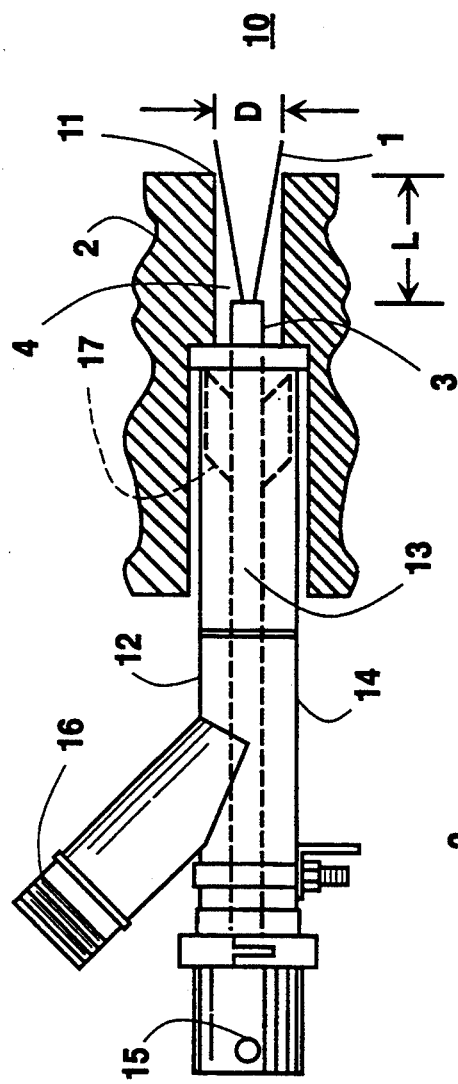
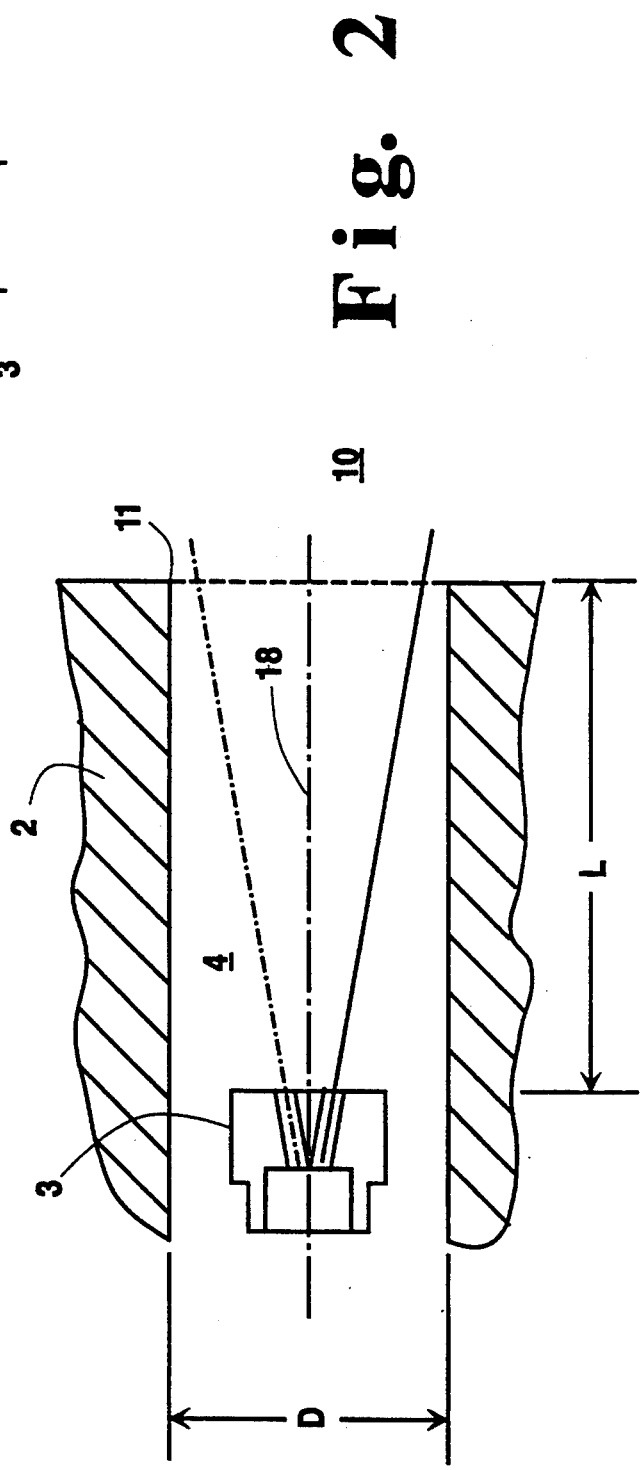
Fig. 1
Fig. 2

CONTROLLED FLAME FUEL JET COMBUSTION

TECHNICAL FIELD

This invention relates to methods and apparatus for carrying out combustion in conjunction with a high temperature combustion zone.

BACKGROUND ART

High temperature combustion is often employed in many industrial processes such as in glassmelting. Corrosion and fouling of burner nozzles are common problems in high temperature industrial processes. Water cooling of metallic nozzles is often used to prevent high temperature corrosion or melting. Although water cooling is effective in a relatively clean furnace atmosphere, it adds to the complexity of the combustion system and also could escalate the corrosion and fouling problem when the furnace atmosphere contains condensible vapors. Ceramic nozzles have been proposed for use with high temperature combustion as a way for avoiding water cooling. However, presently available ceramic nozzles tend to develop cracks due to thermal and other stresses and are not considered dependable for many industrial applications. The problem of designing a non-water cooled burner is particularly severe where the burner employs oxygen or oxygen-enriched air rather than air as the oxidant because of the high flame temperature generated.

High temperature combustion may be carried out by injecting fuel at a high velocity into a furnace zone as this enables the major part of the combustion reaction to be well away from the nozzle or fuel injection point. Furthermore the fuel injection may occur in a cavity communicating with the furnace for further protection of the nozzle. Other heat protection steps include employing a flame detached from the burner nozzle and operating within a cavity having an expanded flow area. However, high velocity fuel injection may cause the generation of an excessively long flame length.

Accordingly, it is an object of this invention to provide an improved combustion method which may effectively employ high velocity fuel injection for carrying out high temperature combustion without the need for water cooling of the fuel injection nozzle and without generating an excessively long flame.

SUMMARY OF THE INVENTION

The above and other objects which will become apparent to one skilled in the art upon a reading of this disclosure are attained by the present invention, one aspect of which is:

A combustion method for carrying out high temperature combustion comprising:
  (A) providing a substantially cylindrical cavity having an opening with a diameter D communicating with a furnace zone;
  (B) injecting a fuel stream through a nozzle into the cavity at a point recessed from the opening at a velocity within the range of from 100 to 700 feet per second, said recess having a length L such that L/D is at least 1.0 but not more than 4.0;
  (C) injecting oxidant fluid having an oxygen concentration of at least 30 percent into the cavity in an annular stream and flowing the oxidant fluid in a swirling motion coaxially with the fuel stream at a velocity not more than 100 feet per second; and
  (D) establishing a stable flame attached to the nozzle while combusting fuel and oxygen within the cavity and passing the combusting fuel and oxygen into the furnace zone to provide heat to the furnace zone.

Another aspect of the invention is:

A combustion method of carrying out high temperature combustion comprising:
  (A) providing a substantially cylindrical cavity having an opening with a diameter D communicating with a furnace zone;
  (B) injecting fuel in a plurality of fuel streams angled from the centerline of the cavity through a nozzle into the cavity at a point recessed from the opening at a velocity within the range of from 50 to 700 feet per second, said recess having a length L such that L/D is at least 1.0 but not more than 4.0;
  (C) injecting oxidant fluid having an oxygen concentration of at least 30 percent into the cavity in an annular stream to the fuel at a velocity lower than that of the fuel velocity and not more than 100 feet per second; and
  (D) establishing a stable flame attached to the nozzle while combusting fuel and oxygen within the cavity and passing the combusting fuel and oxygen into the furnace zone to provide heat to the furnace zone.

BRIEF DESCRIPTION OF THE DRAWINGS

FIG. 1 is a simplified cross-sectional view of one apparatus which may be used to practice this invention.

FIG. 2 is a simplified view of one embodiment of a fuel injection nozzle which may be used to practice this invention.

DETAILED DESCRIPTION

Figure 3:
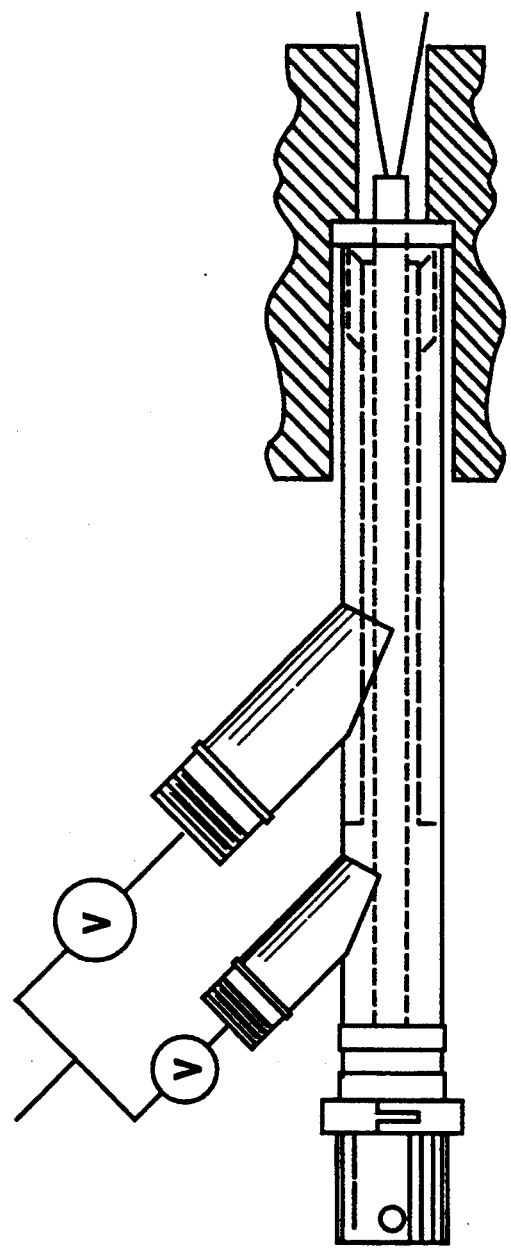
FIG. 3 is a simplified cross-sectional view of one apparatus which may be used to practice this invention wherein an additional annular oxidant stream may be provided into the cavity without a swirling motion coaxially with the fuel stream and positioned between the fuel stream and the swirling oxidant stream.

The invention comprises the injection of high velocity fuel and low velocity oxidant fluid in a coaxial relationship into a cavity leading to a furnace zone. Preferably the fuel and oxidant are injected into the cavity in a staggered arrangement. A tangential or angular component is provided to the fluid flow by swirling the oxygen and/or angling the fuel flow. The tangential or angular component reduces the length of the flame resulting from the high velocity fuel injection. The tangential or angular component may be controlled, for example, by changing swirl vanes or nozzles, thus enabling one to control the flame length.

The invention will be described in greater detail with reference to the Drawings.

Referring now to FIG. 1, refractory wall 2 borders furnace zone 10 where there is contained a furnace atmosphere comprising furnace gases such as, for example, carbon dioxide, water vapor, nitrogen, and/or oxygen. The furnace atmosphere is generally at an elevated temperature typically exceeding 1000° F. and may be as high as 3000° F. or more. The furnace atmosphere may also contain particulate matter, such as glass batch materials or ash from coal combustion, and/or condensible vapors such as sodium species or acid vapors.

Within refractory wall 2 there is provided substantially cylindrical cavity 4 which communicates with furnace zone 10 at opening 11 which has a diameter D. Generally, opening 11 will have a diameter D less than 3 inches and preferably within the range of from 0.5 to 2.5 inches. The very small diameter, combined with the cylindrical shape of the cavity and with the defined recess, serves to maintain furnace gases from passing from the furnace zone into the cavity and also reduces the heat passed from the furnace zone into the cavity. Burner 12 is positioned for injecting fuel and oxidant into cavity 4. Burner 12 comprises central conduit 13 and annular conduit or injector 14 which runs coaxially with central conduit 13. Nozzle 3 is positioned on the end of conduit 13 within cavity 4 so as to inject a fuel stream or jet from nozzle 3 in a direction toward opening 11 and then into furnace zone 10. The tip of nozzle 3 is recessed from opening 11 by a distance L such that L/D is at least 1.0 but not more than 4.0. Preferably L/D is within the range of from 1.5 to 3.0. The recess of nozzle 3 is sufficient to protect nozzle 3 from damage due to the conditions within furnace zone 10 while not being so great as to cause combustion stream 1 to expand into the walls of cavity 4 prior to entering into furnace zone 10. The most suitable recess will depend upon the furnace temperature; the higher is the furnace temperature the greater would be the recess.

The fuel is injected out nozzle 3 at a high velocity within the range of from 100 to 700 feet per second, preferably within the range of from 150 to 700 feet per second. The fuel may be any fluid which contains combustibles which may combust in the combustion zone. Among such fuels one can name natural gas, coke oven gas, propane, hydrogen, atomized oil and methane. The fuel is provided to burner 12 from fuel source 15 from which it is passed through burner 12 into cavity 4.

Oxidant fluid is injected into cavity 4 in an annular stream coaxially with the fuel stream from annular injector 14. The oxidant fluid is oxygen-enriched air having an oxygen concentration of at least 30 percent, preferably at least 90 percent, or technically pure oxygen having an oxygen concentration of at least 99.5 percent. The annular injector injects the oxidant fluid into the cavity 4 preferably at a point further recessed from opening 11 than is the tip of nozzle 3. The oxidant fluid is provided to burner 12 from oxidant source 16 from which it is passed through burner 12 into cavity 4. The annular or coaxial oxidant fluid stream is injected into cavity 4 at a low velocity not more than 100 feet per second and generally within the range of from 5 to 100, preferably 10 to 50, feet per second.

The oxidant fluid may be injected into cavity 4 so as to have a swirling motion as it is passed through cavity 4. In the embodiment illustrated in FIG. 1, there is employed a plurality of vanes 17 positioned proximate the injection end of coaxial injector conduit 14. The vanes 17 are angled so as to impart a swirling motion to the oxidant fluid as it flows through cavity 4. The swirling motion, in turn, reduces the axial momentum of the combusting fuel and oxygen stream 1 by directing oxygen radially and also expanding the stream diameter after it leaves cavity 4 thus serving to reduce the length of the resulting flame. The degree of swirling may be controlled by adjusting the angle of the vanes.

In conventional combustion system arrangements which employ a swirling motion with the oxidant or fuel stream, the swirling motion causes furnace gases to be drawn into the cavity from the furnace zone. These drawn furnace gases serve to stabilize the flame within the cavity. However, they are also a source of damage to the burner nozzle. In contrast to conventional swirl combustion systems, in the practice of this invention furnace gases from the furnace zone are kept from flowing into the cavity by the small diameter of the cavity opening coupled with the widening flame stream passing through the cylindrical cavity. The flame is stabilized by the attachment of the flame to the nozzle. The stable attachment of the flame to the nozzle is achieved by the oxygen-enriched nature of the oxidant fluid and by the selection of the velocities of the fuel and oxidant fluid within the defined ranges. In this way the requisite flame stability is attained without drawing hot and possibly corrosive furnace gases into the cavity.

Furthermore, to increase the control of the flame shape, an additional annular oxidant stream may be provided into the cavity without a swirling motion coaxially with the fuel stream and positioned between the fuel stream and the swirling oxidant stream so as to have an outer swirling oxidant stream and an axial co-flowing non-swirling oxidant stream around a central fuel stream. By varying the relative amounts of the swirling and axial oxidant streams, the flame shape can be changed without physical replacement of the burner components.

In addition to, or as an alternative to, the oxygen swirl discussed above for imparting an angular component to the combusting fuel and oxygen stream, the fuel may be injected into cavity 4 through nozzle 3 in a plurality of fuel streams angled from the centerline of cavity 4, generally at an angle within the range of from 1 to 10 degrees. Such an arrangement is illustrated in stylized terms in FIG. 2. The numerals in FIG. 2 correspond to those of FIG. 1 for the common elements. In FIG. 2 there is shown a plurality of fuel streams injected into cavity 4 each at an angle of 7.5 degrees from the centerline 18 of cavity 4. The angular injection of the fuel imparts an angular component to the combusting fuel and oxygen stream, thus serving to reduce the length of the resulting flame. In this embodiment the fuel may have a velocity within the range of from 50 to 700 feet per second and the oxidant has a velocity lower than that of the fuel and not more than 100 feet per second.

Central fuel conduit 13 is metallic and is preferably made of copper to enable heat to be readily conducted away from nozzle 3. Nozzle 3 is made of a high temperature alloy such as stainless steel. Annular coaxial conduit 14 is preferably made of stainless steel.

In operation the fuel is injected into cavity 4 through central conduit 13 and nozzle 3 as one or more high velocity streams. Oxidant fluid is injected into cavity 4 through annular coaxial conduit 14 as a low velocity annular coaxial stream. The oxidant and fuel combust within cavity 4. Because of the low velocity of the oxidant relative to the fuel, the resulting flame is attached to the nozzle and the combustion is stable. The stable fuel-oxidant flame 1 attached to fuel nozzle 3, expands slowly and extends out of cavity 4 through opening 11 into furnace zone 10 wherein combustion continues providing heat into the furnace zone and generating furnace gases. By "attached to the nozzle" it is meant that the flame is adjacent the nozzle and is not moved away from the nozzle as in conventional high velocity practice. The attachment of the flame to the fuel nozzle enhances the stability of the flame. The attachment is brought about by the low velocity annular coaxial oxidant fluid despite the high velocity of the fuel. The resulting stable flame and the steady expansion of the combusting stream 1 within cavity 4 serve to substantially maintain furnace gases outside cavity 4 and substantially prevent furnace gases from becoming entrained within cavity 4 despite the large recess between opening 11 and nozzle 3. By taking advantage of the reacting combustion stream's substantially lower rate of entrainment of surrounding gases compared with a non-reacting stream, the burner system, particularly the nozzle, is protected from damage despite high combustion zone temperatures and the presence of corrosive or condensible species within the furnace gases. Thus, furnace gases are maintained outside the cavity despite the high velocity of the fuel stream. Outside of cavity 4 within furnace zone 10, the high velocity of the combusting stream causes furnace gases to aspirate into or become entrained within the combusting stream.

The following examples are provided to further illustrate the invention or to highlight the advantages of the invention. The examples are not intended to be limiting. In carrying out the examples an apparatus similar to that illustrated in FIG. 1 was employed in conjunction with a furnace. The fuel was natural gas and the oxidant fluid was technically pure oxygen. D was 1.75 inches and L/D was 1.5. The furnace zone temperature was 2800° F.

For comparative purposes, combustion was carried out without either oxygen swirl or angled fuel injection. The fuel velocity was 150 feet per second (fps) and the oxygen velocity was 60 fps. The temperature on the other side of the furnace zone at the furnace zone wall opposite the cavity opening was about 2820° F. The procedure was repeated except that the oxygen was injected into the cavity having a swirling motion imparted by swirl vanes located within the oxygen injection conduit as illustrated in FIG. 1. The flame length was reduced over that observed without the oxygen swirl as evidenced by the temperature on the other side of the furnace zone which was only about 2730° F.

Combustion was carried out with the fuel injected into the cavity at a velocity of 700 fps in four streams, each of which diverged from the cavity centerline at an angle of 5 degrees. The oxygen velocity was 60 fps. The temperature on the other side of the furnace zone was only about 2790° F. despite the very high fuel injection velocity. The procedure was repeated except that the oxygen was injected into the cavity having a swirling motion imparted by swirl vanes located within the oxygen injection conduit as illustrated in FIG. 1. The temperature on the other side of the furnace zone was about 2775° F.

Combustion was carried out with the fuel injected into the cavity at a velocity of 360 fps in four streams each of which diverged from the cavity centerline at an angle of 5 degrees. The oxygen velocity was 60 fps. The temperature on the other side of the furnace was about 2785° F. The procedure was repeated except that the oxygen was injected into the cavity having a swirling motion imparted by swirl vanes located within the oxygen injector conduit as illustrated in FIG. 1. The temperature on the other side of the furnace was 2730° F.

Now by the use of this invention one can carry out combustion at high temperatures without excessive NOx generation while protecting the combustion equipment from excess wear without the need for water cooling and while controlling the combustion flame length. In particular with the practice of this invention one can place the burner a significant distance into the cylindrical refractory walled cavity without encountering heat related problems. Heretofore, it has been thought that the burner must be virtually entirely outside of a cylindrical cavity in order to avoid heat damage to the burner in non-water cooled operations. With the practice of this invention the burner may extend through a third or more of the cavity length and preferably, as illustrated in FIG. 1, may extend through more than one half of the cavity length while still avoiding significant heat related problems. Although the invention has been described in detail with reference to certain embodiments, those skilled in the art will recognize that there are other embodiments of the invention within the spirit and the scope of the claims.

We claim:

1. A combustion method for carrying out high temperature combustion comprising:
   (A) providing a substantially cylindrical cavity having an opening with a diameter D communicating with a furnace zone;
   (B) injecting a fuel stream through a nozzle into the cavity at a point recessed from the opening at a velocity within the range of from 100 to 700 feet per second, said point being recessed from the opening by a length L such that L/D is at least 1.0 but not more than 4.0;
   (C) injecting oxidant fluid having an oxygen concentration of at least 30 percent into the cavity in an annular stream and flowing the oxidant fluid in a swirling motion coaxially with the fuel stream at a low velocity not more than 100 feet per second; and
   (D) establishing a stable flame attached to the nozzle while combusting fuel and oxygen within the cavity and passing the combusting fuel and oxygen into the furnace zone to provide heat to the furnace zone.

2. The method of claim 1 wherein D is less than 3.0 inches.

3. The method of claim 1 further comprising injecting a non-swirling oxidant fluid into the cavity between the fuel stream and the swirling oxidant fluid.

4. The method of claim 1 wherein L/D is within the range of from 1.5 to 3.0.

5. A combustion method for carrying out high temperature combustion comprising:
   (A) providing a substantially cylindrical cavity having an opening with a diameter D communicating with a furnace zone;
   (B) injecting fuel in a plurality of fuel streams angled from the centerline of the cavity through a nozzle into the cavity at a point recessed from the opening at a velocity within the range from 50 to 700 feet per second, said point being recessed from the opening by a length L such that L/D is at least 1.0 but not more than 4.0;
   (C) injecting oxidant fluid having an oxygen concentration of at least 30 percent into the cavity in an annular stream to the fuel at a velocity lower than that of the fuel velocity and not more than 100 feet per second; and
   (D) establishing a stable flame attached to the nozzle while combusting fuel and oxygen within the cavity and passing the combusting fuel and oxygen into the furnace zone to provide heat to the furnace zone.

6. The method of claim 5 wherein the oxidant fluid is injected into the cavity having a swirling motion.

7. The method of claim 5 further comprising injecting a non-swirling oxidant fluid into the cavity between the fuel stream and the swirling oxidant fluid.

8. The method of claim 5 wherein D is less than 3.0 inches.

9. The method of claim 5 wherein L/D is within the range of from 1.5 to 3.0.

* * * * *